(12) United States Patent
Zhou et al.

(10) Patent No.: US 11,307,891 B2
(45) Date of Patent: Apr. 19, 2022

(54) VIRTUAL REALITY APPLICATION DATA PROCESSING METHOD, COMPUTER DEVICE AND STORAGE MEDIUM

(71) Applicant: TENCENT TECHNOLOGY (SHENZHEN) COMPANY LIMITED, Guangdong (CN)

(72) Inventors: Yang Zhou, Shenzhen (CN); Long fang Lin, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 368 days.

(21) Appl. No.: 16/508,483

(22) Filed: Jul. 11, 2019

(65) Prior Publication Data

US 2019/0332418 A1    Oct. 31, 2019

Related U.S. Application Data

(63) Continuation of application No. PCT/CN2018/083584, filed on Apr. 18, 2018.

(30) Foreign Application Priority Data

May 9, 2017 (CN) .......................... 201710322336.3

(51) Int. Cl.
   *G06F 9/48*     (2006.01)
   *G06F 9/50*     (2006.01)
   *G06T 19/00*    (2011.01)
   *G06K 9/00*     (2022.01)

(52) U.S. Cl.
   CPC ............ *G06F 9/485* (2013.01); *G06F 9/5038* (2013.01); *G06K 9/00671* (2013.01); *G06T 19/006* (2013.01)

(58) Field of Classification Search
   CPC ...... G06F 9/485; G06F 9/5038; G06F 3/0484; G06F 9/451; G06K 9/00671;
   (Continued)

(56) References Cited

U.S. PATENT DOCUMENTS 9,616,338 B1    4/2017 Hooper et al.
2013/0329060 A1* 12/2013 Yim ...................... H04N 5/272
                                                    348/207.1
(Continued)

FOREIGN PATENT DOCUMENTS

CN    104111864 A  * 10/2014
CN    104111864 A    10/2014
(Continued)

OTHER PUBLICATIONS

Extended European Search Report dated Jan. 13, 2021 in European Application No. 18799360.5.
(Continued)

*Primary Examiner* — Jennifer N Welch
*Assistant Examiner* — Parmanand D Patel
(74) *Attorney, Agent, or Firm* — Sughrue Mion, PLLC

(57) ABSTRACT

A method of processing data in a virtual reality (VR) application is provided. The VR application is restored to an initial running state in response to receiving a playback start instruction. Manipulation data that are transmitted to a runtime library to be pre-captured and stored are obtained, the manipulation data having a time sequence and being used to control running of the VR application. The manipulation data are imported into the runtime library based on the time sequence. The imported manipulation data are transferred to the VR application in the initial running state by using the runtime library and performing playback processing based on the transferred manipulation data.

18 Claims, 10 Drawing Sheets

(58) Field of Classification Search
CPC ........ G06T 19/006; G06T 11/00; A63F 13/77; A63F 13/497; A63F 13/48; A63F 13/5252; A63F 13/493; A63F 13/67
See application file for complete search history.

(56) References Cited

U.S. PATENT DOCUMENTS

| | | |
|---|---|---|
| 2014/0368519 A1 | 12/2014 | Wood et al. |
| 2015/0097864 A1 | 4/2015 | Alaniz et al. |
| 2016/0267720 A1* | 9/2016 | Mandella .............. G06F 1/1686 |
| 2017/0209786 A1* | 7/2017 | Zhu ........................ A63F 13/92 |
| 2017/0249785 A1* | 8/2017 | Hooper ................. A63F 13/335 |
| 2019/0051055 A1* | 2/2019 | Leppanen ............... G06F 3/017 |

FOREIGN PATENT DOCUMENTS

| | | | |
|---|---|---|---|
| CN | 104580973 A | * | 4/2015 |
| CN | 104580973 A | | 4/2015 |

OTHER PUBLICATIONS

Written Opinion of the International Searching Authority dated Jul. 23, 2018 in International Application No. PCT/CN2018/083584.
Theoktisto et al., "On Extending Collaboration in Virtual Reality Environments", Proceedings. 17th Brazilian Symposium on Computer Graphics and Image Processing, 2004, pp. 324-331 (8 pages total).
International Search Report for PCT/CN2018/083584, dated Jul. 23, 2018.

* cited by examiner

_(1)_

VIRTUAL REALITY APPLICATION DATA PROCESSING METHOD, COMPUTER DEVICE AND STORAGE MEDIUM

CROSS-REFERENCE TO RELATED APPLICATION(S)

This application is a continuation application of International Application No. PCT/CN2018/083584, filed with the Chinese Patent Office on Apr. 18, 2018, which claims priority to Chinese Patent Application No. 201710322336.3, entitled "VIRTUAL REALITY APPLICATION DATA PROCESSING METHOD, COMPUTER DEVICE, AND STORAGE MEDIUM" and filed with the Chinese Patent Office on May 9, 2017, the disclosures of which are herein incorporated by reference in their entireties.

BACKGROUND

1. Field

The disclosure relates to the field of computer technologies, and in particular, to a virtual reality (VR) application data processing method, a computer device, and a storage medium.

2. Description of the Related Art

With rapid development of science and technology, an increased number of types of applications are available. Virtual reality (VR) applications are increasingly popular by virtue of high interactivity and better user experience.

At present, some VR applications require a user to perform a series of operations, and the user can perform a next operation only after completing a previous operation. If the user intends to again perform an operation included in history of previous operations, the user needs to re-operate from the beginning until a target operation intended by the user is performed.

Therefore, at present, when a user intends to perform an operation included in a history of previous operations again, the user needs to re-operate from the beginning, leading to relatively low operation efficiency and waste of resources.

SUMMARY

One or more example embodiments provide a virtual reality (VR) application data processing method, a computer device, and a storage medium are provided.

According to an aspect of an example embodiment, a method of processing data in a virtual reality (VR) application is provided. The VR application is restored to an initial running state in response to receiving a playback start instruction. Manipulation data that are transmitted to a runtime library to be pre-captured and stored are obtained, the manipulation data having a time sequence and being used to control running of the VR application. The manipulation data are imported into the runtime library based on the time sequence. The imported manipulation data are transferred to the VR application in the initial running state by using the runtime library and performing playback processing based on the transferred manipulation data.

According to an aspect of another example embodiment, provided is a computer device, including: at least one memory operable to store program code; and at least one processor operable to read the program code and operate as instructed by the program code. The program code includes restoring code configured to cause at least one of the at least one processor to restore the VR application to an initial running state in response to receiving a playback start instruction; first obtaining code configured to cause at least one of the at least one processor to obtain manipulation data that are transmitted to a runtime library to be pre-captured and stored, the manipulation data having a time sequence and being used to control running of the VR application; first importing code configured to cause at least one of the at least one processor to import the manipulation data into the runtime library based on the time sequence; and transferring code configured to cause at least one of the at least one processor to transfer the imported manipulation data to the VR application in the initial running state by using the runtime library and performing playback processing based on the transferred manipulation data.

According to an aspect of still another example embodiment, provided is a non-transitory storage medium storing a computer-readable instruction, which is executable by at least one processor to perform: restoring the VR application to an initial running state in response to receiving a playback start instruction; obtaining manipulation data that are transmitted to a runtime library to be pre-captured and stored, the manipulation data having a time sequence and being used to control running of the VR application; importing the manipulation data into the runtime library according to the time sequence; and transferring the imported manipulation data to the VR application in the initial running state by using the runtime library and performing playback processing based on the transferred manipulation data.

BRIEF DESCRIPTION OF THE DRAWINGS

These and/or other aspects will become apparent and more readily appreciated from the following description of the embodiments, taken in conjunction with the accompanying drawing. Apparently, the accompanying drawings in the following description show merely some embodiments, and a person of ordinary skill in the art may still derive other drawings from these accompanying drawings without creative efforts.

DETAILED DESCRIPTION

To make the objectives, the technical solutions, and the advantages of the disclosure clearer, the following further describes the disclosure in detail with reference to the accompanying drawings and example embodiments. It should be understood that the specific embodiments described herein are only used to describe the disclosure, instead of limiting the disclosure.

The terms "a module" and/or "a unit" used in the disclosure are for referring to elements performing at least one function or operation, and these elements may be implemented as hardware or software, or as a combination of hardware and software. Further, a plurality of "modules" or "units" may be integrated into at least one module and implemented as at least one processor, except "modules" or "unit" that need to be implemented as specific hardware.

Figure 1:
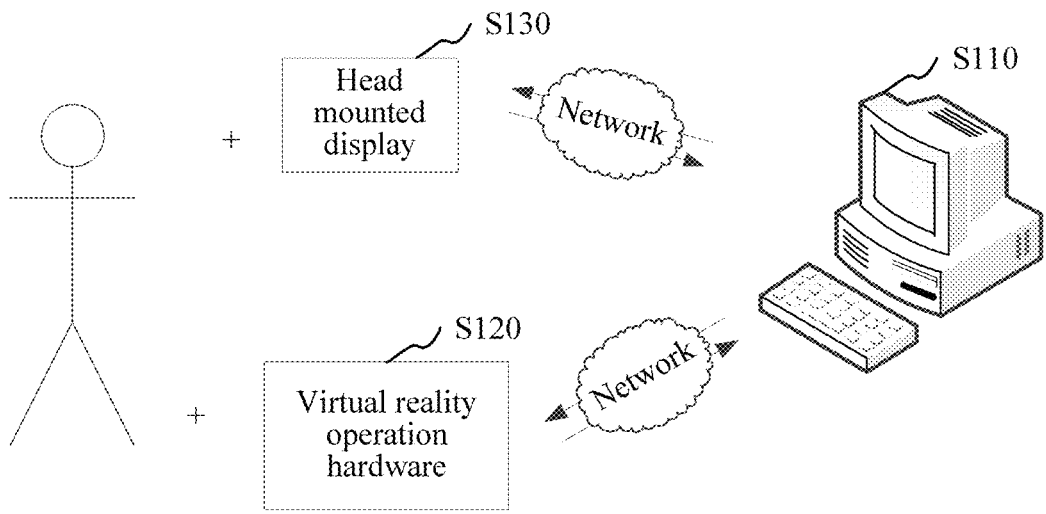
FIG. 1 is a diagram of an application environment of a VR application data processing method according to an embodiment.

FIG. 1 is a diagram of an application environment of a virtual reality (VR) application data processing method according to an embodiment.

Referring to FIG. 1, the application environment of an interaction data processing method (or a VR application data processing method) includes a terminal 110, VR operation hardware 120 (e.g., server), and a head mounted display (HMD) 130. A VR application program (which may be referred to as a VR application) is installed in the terminal 110. The VR operation hardware 120 is configured to: receive or acquire a control operation, and generate manipulation data to be used to control running of the VR application program. The VR operation hardware 120 may include an operation handle, a position tracking device, and/or the like. The manipulation data may include operation control data generated by an operation performed by the handle, and/or physical space position data generated through position tracking by the position tracking device. The head mounted display (HMD) 130 is a head-mounted display device having a function of outputting and displaying a VR picture. The terminal 110 may be a desktop computer or a mobile terminal, and the mobile terminal may include at least one of a mobile phone, a tablet computer, a personal digital assistant, a wearable device, and the like.

The terminal 110 may receive a playback start instruction, and restore a VR application to an initial running state in response to the playback start instruction. The terminal 110 obtains pre-captured and stored manipulation data, sent by VR operation hardware 120 to a runtime library and having a time sequence, and imports the manipulation data into the runtime library according to the corresponding time sequence. The terminal 110 transfers the imported manipulation data to the VR application in the initial running state by using the runtime library, and performs playback processing based on the transferred manipulation data. In an embodiment, the terminal 110 may output, to the HMD 130, a playback picture that is generated by the VR application according to the manipulation data. The HMD 130 may display the playback picture. It may be understood that, in another embodiment, the terminal 110 may not output, to the HMD 130 for display, the playback picture generated during the playback processing.

Figure 2:
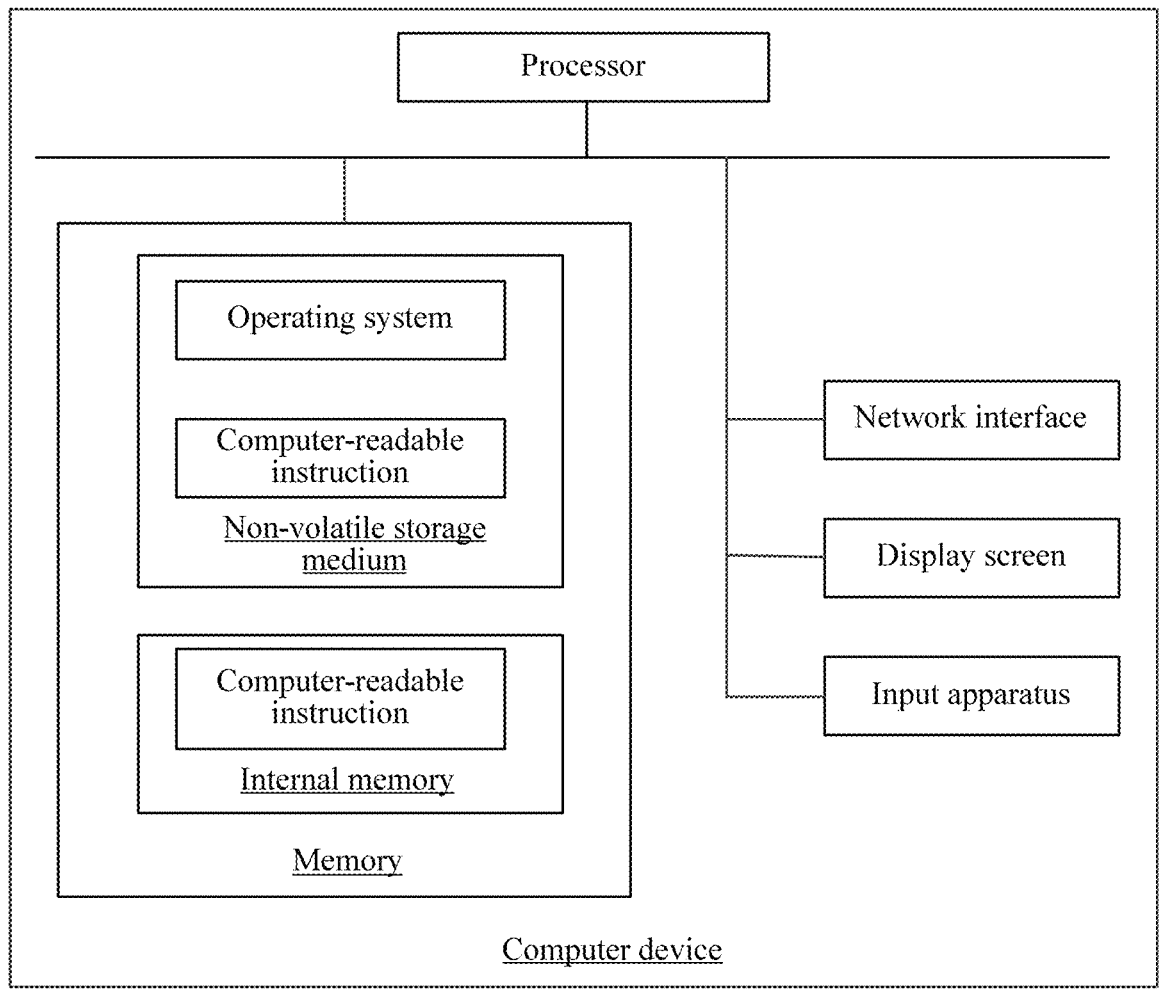
FIG. 2 is a schematic diagram of an internal structure of a computer device according to an embodiment.

FIG. 2 is a schematic diagram of an internal structure of a computer device according to an embodiment.

The computer device shown in FIG. 2 may be the terminal 110 in FIG. 1. Referring to FIG. 2, the computer device includes a processor, a memory, a network interface, a display screen, and an input apparatus that are connected by using a system bus. The memory includes a non-volatile storage medium and an internal memory. The non-volatile storage medium of the computer device may store an operating system and a computer-readable instruction. When the computer-readable instruction is executed, the processor may be caused to perform a VR application data processing method. The processor of the computer device is configured to provide calculation and control capabilities, to support running of the entire computer device. The internal memory may store a computer-readable instruction, and when the computer-readable instruction is executed by the processor, the processor may be caused to perform a VR application data processing method. The network interface of the computer device is configured to perform network communication. The display screen of the computer device may be a liquid crystal display screen or an e-ink display screen. The input apparatus of the computer device may be a touch layer covering the display screen, or may be a key, a trackball, or a touchpad disposed on a housing of the computer device, or may be an external keyboard, touchpad, a mouse, or the like. The touch layer and the display screen form a touchscreen.

A person skilled in the art would understand that, the structure shown in FIG. 2 is merely a block diagram of a partial structure related to a solution in the disclosure, and does not constitute a limitation to the computer device to which the solution in disclosure is applied. Specifically, the computer device may include more components or fewer components than those shown in the figure, or some components may be combined, or a different component deployment may be used.

Figure 3:
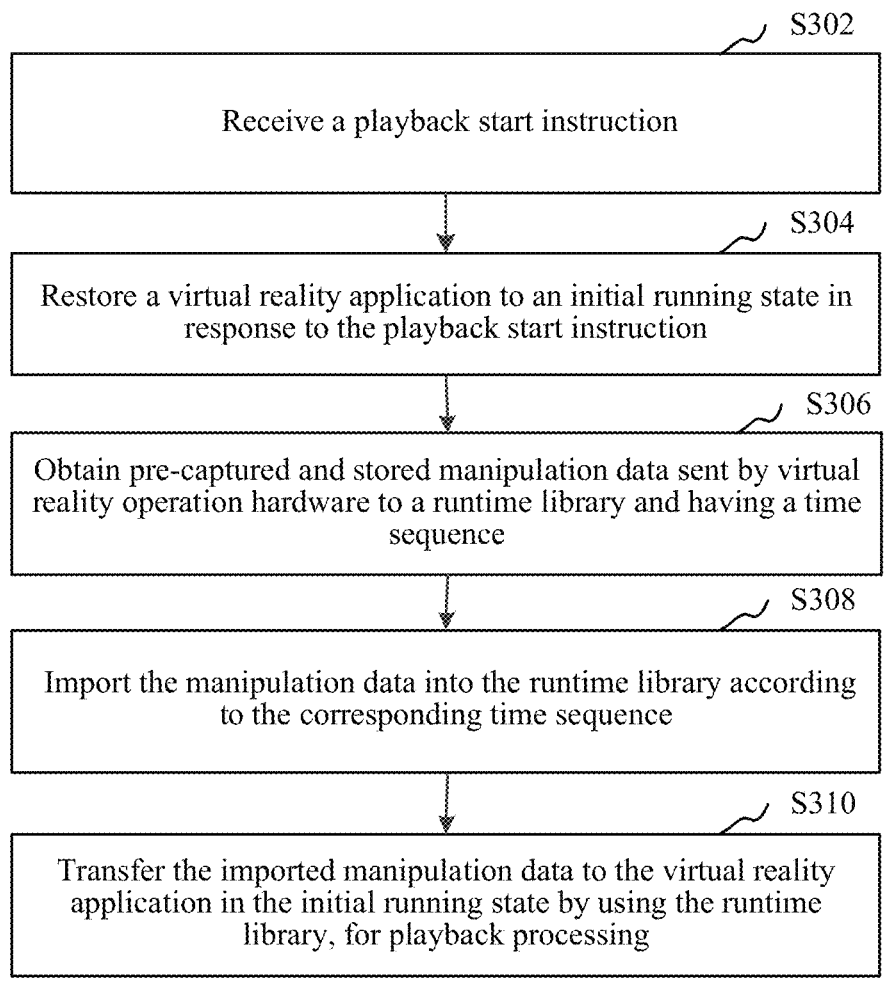
FIG. 3 is a schematic flowchart of a VR application data processing method according to an embodiment.

FIG. 3 is a schematic flowchart of a VR application data processing method according to an embodiment. In this embodiment, an example in which the VR application data processing method is applied to the terminal 110 in FIG. 1 is mainly used for description. Referring to FIG. 3, the method specifically includes the following operations S302-S310:

S302: Receive a playback start instruction.

The playback start instruction is used for triggering execution of playback processing logic.

In an embodiment, a playback switch may be disposed on the terminal, and generation of the playback start instruction is triggered through a triggering operation by the playback switch (for example, a touch operation, a slide operation, a tap operation, or a press operation). The playback switch is a functional key used for controlling playback starting and/or ending. The playback switch may be an independent functional key or may be a functional key combining a plurality of keys. The playback switch may be a physical key, or may be a virtual switch displayed on the screen of the terminal.

In another embodiment, a preset playback triggering action may alternatively be performed on the terminal, to trigger generation of the playback start instruction.

In an embodiment, a playback mode can be entered after the playback start instruction is received. The playback mode is a mode used for performing playback processing.

S304: Restore a VR application to an initial running state in response to the playback start instruction.

VR means that a virtual world of three-dimensional space is generated through computer simulation, and a user is provided with simulation of a visual sense, an auditory sense, a touch sense, or the like, so that the user feels as if the user is immersed, and observes things in the three-dimensional space.

The VR application is an application program configured to achieve a VR effect. In an embodiment, the VR application may be a VR game application program. It may be understood that, the VR application may also be another type of application program.

The initial running state is a state during initial running of the VR application. Specifically, the VR application may be restarted to restore the VR application to the initial running state, or the VR application may be restored to the initial running state by using a restoration mechanism.

S306: Obtain pre-captured and stored manipulation data sent by VR operation hardware to a runtime library and having a time sequence.

The VR operation hardware is hardware configured to: receive a control operation, and generate manipulation data to be used to control running of the VR application program. The VR operation hardware may include an operation handle, a position tracking device, and/or the like. It may be understood that, if a head-mounted display device and a control handle can achieve a position tracking function, and can acquire the manipulation data and send the manipulation data to the terminal, the head-mounted display device and the control handle are also position tracking devices.

The manipulation data is data corresponding to the control operation and achieving a function of controlling the running of the VR application. The manipulation data may include operation control data generated by an operation performed by the handle, and/or physical space position data generated through position tracking by the position tracking device.

In an embodiment, the manipulation data may include one or a combination of a data block size, a time node, a manipulation event type, a manipulation device type, manipulation duration, manipulation event additional data, and the like.

The manipulation event type includes handle button rotation, head mounted display rotation, and/or the like. The manipulation device type includes a handle, an HMD, and/or the like. The manipulation event additional data includes physical space position data during manipulation, and a physical space position may include physical space position data of the HMD (namely, HMD position data). It may be understood that, the event additional data may further include other data associated with manipulation. Table 1 shows a storage structure of manipulation data in an embodiment.

For illustrative purposes, an example of composition of operation data, for example, the manipulation data is "40 10:44:28.545545 305 2 2 2, 3, 1", where 40: indicates a stored data block size;
10:44:28.545545: indicates a time node
305: indicates a left-handle scroll button;
2: indicates a left handle
2: indicates a scroll time length of the handle; and
2, 3, 1: indicates a physical space position of the handle during scrolling.

The runtime library is a special computer program library used by a compiler to implement a programming language built-in function, to provide language program runtime (execution) support. The runtime library is used as a conversion layer between hardware and an application after a language program is run. In this embodiment, the runtime library may be used for feeding back, to the VR application, the manipulation data sent by the VR operation hardware.

Figure 4:
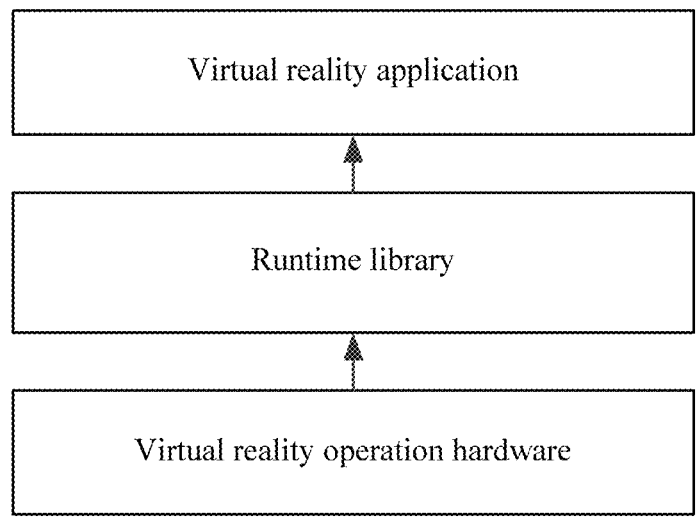
FIG. 4 is a system block diagram according to an embodiment.

FIG. 4 is a system block diagram according to an embodiment. The VR operation hardware sends the manipulation data to the runtime library, and the runtime library feeds back the manipulation data to the VR application.

It may be understood that, when the user directly operates the VR application, the manipulation data, sent by the VR operation hardware to the runtime library and having the time sequence, may be captured and stored, to obtain the pre-captured and stored manipulation data having the time sequence. After receiving the playback start instruction, the terminal may obtain the pre-captured and stored manipulation data, sent by the VR operation hardware to the runtime library and having the time sequence.

The capturing is a data obtaining manner of interception and transferring. That is, the terminal may intercept the manipulation data, sent by the VR operation hardware to the runtime library and having the time sequence, to obtain the manipulation data, and continue to transfer the manipulation data to the runtime library, thereby avoiding impact on a normal operation and use of the VR application by the user when the manipulation data is obtained.

The time sequence may be in a chronological order. Storage of the manipulation data having the time sequence is storage of manipulation data in a chronological order. There may be one or more pieces of manipulation data. In an embodiment, each piece of manipulation data and a corresponding time node may be correspondingly stored, or the manipulation data may be stored in a corresponding chronological order, and only the manipulation data is stored.

In an embodiment, before receiving a playback start instruction, the method further includes: registering a callback function with the runtime library; and invoking the callback function when the VR operation hardware sends, to

TABLE 1

| Data block size 1 | Time node 1 | Manipulation event type 1 | Manipulation device type 1 | Manipulation event duration 1 | Manipulation event additional data 1 |
|---|---|---|---|---|---|
| Data block size 2 | Time node 2 | Manipulation event type 2 | Manipulation device type 2 | Manipulation event duration 2 | Manipulation event additional data 2 |
| . . . | . . . | . . . | . . . | . . . | . . . |
| Data block size N | Time node N | Manipulation event type N | Manipulation device type N | Manipulation event duration N | Manipulation event additional data N | the runtime library, the manipulation data having the time sequence, to capture and store the manipulation data having the time sequence.

The callback function is used for capturing the manipulation data, sent by the VR operation hardware to the runtime library and having the time sequence. In an embodiment, the callback function may be a hook function.

Specifically, when the VR application is in the initial running state, the terminal may register the callback function with the runtime library by invoking a register event callback function (RegisterHookEvent( )) in the runtime library. The register event callback function is used for registering, with the runtime library, the callback function in the terminal that is used for capturing the manipulation data. As the user operates the VR application, the VR operation hardware generates the manipulation data. When the VR operation hardware sends the manipulation data having the time sequence to the runtime library, the terminal may invoke the callback function, to capture and store the manipulation data having the time sequence. In an embodiment, the terminal may register the callback function with the runtime library when receiving an exercise mode enabling instruction. When an exercise mode is enabled, the VR application is in the initial running state. The exercise mode may be a mode when the VR application is normally operated and used. The exercise mode may alternatively be a separate mode dedicated for exercise. For example, for a VR game application, the exercise mode may be a mode that allows the user to practice an operation without considering a user level.

In another embodiment, the terminal may alternatively register the callback function with the runtime library when the VR application is started. It may be understood that the VR application is in the initial running state during starting of the VR application.

In the foregoing embodiment, the callback function is registered with the runtime library, and the manipulation data, sent by the VR operation hardware to the runtime library and having the time sequence, is captured and stored by using the callback function, thereby avoiding impact on a normal operation and use of the VR application by the user when the manipulation data is obtained.

S308: Import the manipulation data into the runtime library according to the corresponding time sequence.

Specifically, the terminal may import the corresponding manipulation data into the runtime library according to chronological time sequences.

In an embodiment, the terminal may invoke an event import function in the runtime library, to import the manipulation data into the runtime library according to the corresponding time sequence. The event import function (PollNextEvent( )) is used for importing the stored manipulation data.

Figure 5:
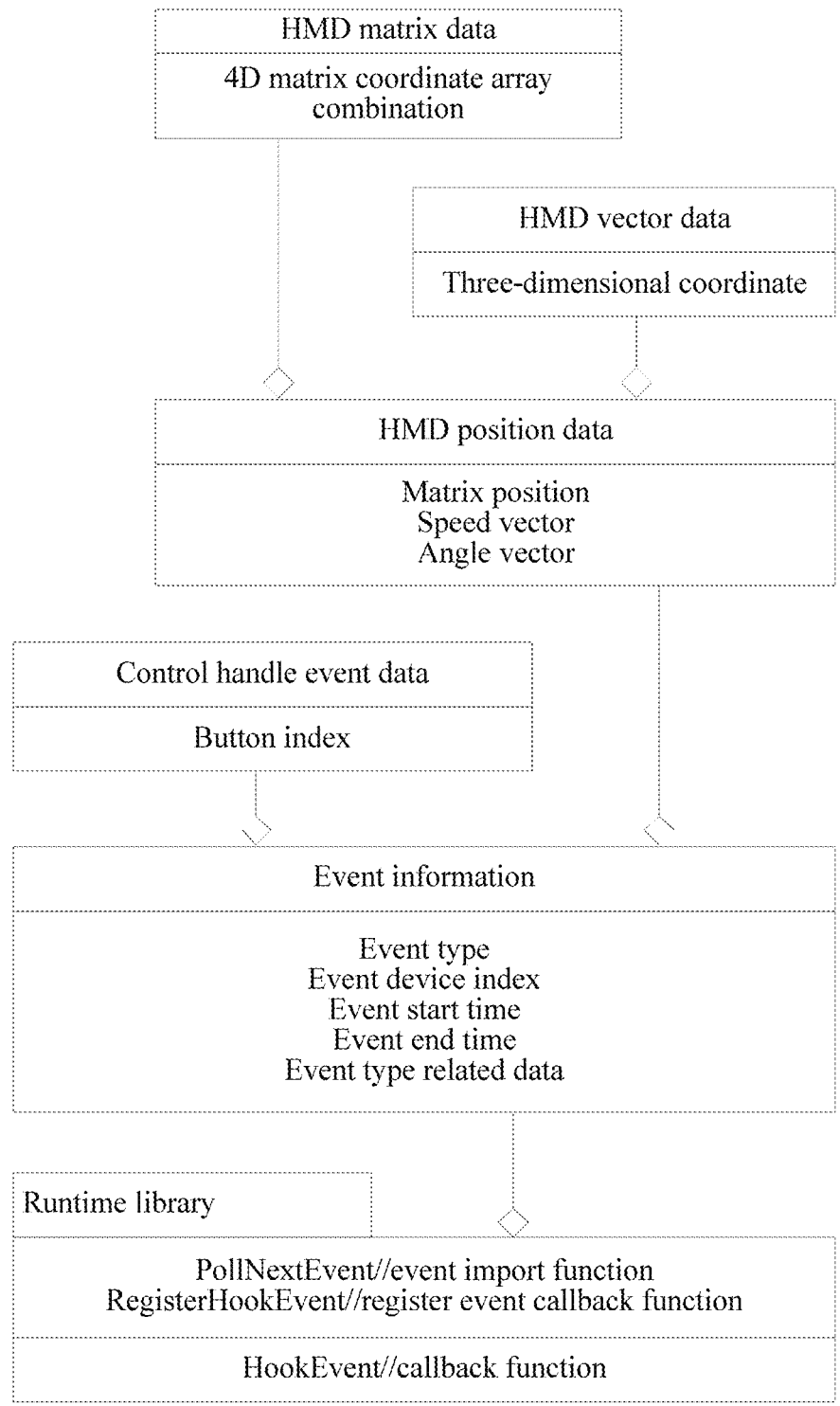
FIG. 5 is a design diagram of a parameter definition structure of a register event callback function and an event import function in a runtime library according to an embodiment.

FIG. 5 is a design diagram of a parameter definition structure of the register event callback function (RegisterHookEvent( )) and the event import function (PollNextEvent( )) in the runtime library according to an embodiment.

A rhombus in FIG. 5 indicates an aggregation relationship, namely, an inclusion relationship between an entirety and a part, and the part form the entirety of the runtime library. For example, HMD matrix data and HMD vector data in FIG. 5 are a part of HMD position data, the HMD position data and control handle event data are a part of event information, and the event information is a part of data to be obtained by using the event import function and the callback function. The event import function may be a preset function in the runtime library, or may be temporary function code injected into the runtime library after the playback start instruction is received (that is, after the playback mode is enabled). The preset function is a function that is preset in the runtime library. Even if the playback start instruction is not received, the preset function also exists in the runtime library. A temporary function is a temporarily injected function, and is a function that is automatically ineffective when system running ends. The temporary function may be a function injected into the runtime library only after the playback start instruction is received, and after the system running ends, the temporary function does not exist in the runtime library.

It may be understood that, when the event import function is temporary function code that is injected into the runtime library after the playback start instruction is received, if the playback start instruction is not received, the import function does not exist in the runtime library, thereby reducing occupation on space of the runtime library.

The terminal may accelerate importing of the manipulation data into the runtime library according to the corresponding time sequence. The terminal may alternatively import the manipulation data into the runtime library according to the corresponding time node, that is, import the runtime library at a normal speed.

S310: Transfer the imported manipulation data to the VR application in the initial running state by using the runtime library, for playback processing.

It may be understood that the runtime library is used for feeding back, to the VR application, the manipulation data sent by the VR operation hardware, so that the terminal imports the manipulation data into the runtime library according to the corresponding time sequence, and the runtime library also transfers the imported manipulation data to the VR application in the initial running state according to the corresponding time sequence.

In an embodiment, to achieve an effect of real-time operation control, the terminal may transfer the manipulation data in real time to the VR application in the initial running state by using the runtime library. That is, after importing the manipulation data into the runtime library, the terminal may transfer the data in real time to the VR application in the initial running state by using the runtime library. In another embodiment, the runtime library may alternatively be improved in advance, and after receiving the imported manipulation data by using the runtime library, instead of transferring the manipulation data in real time to the VR application in the initial running state, the terminal may uniformly transfer the manipulation data to the VR application in the initial running state within a preset period, to reduce data sending frequency and save system resources. Herein, how the terminal transfers the imported manipulation data to the VR application in the initial running state by using the runtime library is not limited, provided that the manipulation data can be sent to the VR application in the initial running state.

It may be understood that, the VR application in the initial running state performs running processing corresponding to the manipulation data, and the transferred manipulation data is manipulation data during a previous user operation. Therefore, the VR application performs the running processing corresponding to the manipulation data, to implement the playback processing.

According to the foregoing VR application data processing method in an example embodiment, manipulation data, sent by VR operation hardware to a runtime library and having a time sequence, is pre-captured and stored; a VR application is restored to an initial running state when a playback start instruction is received; the pre-captured and stored manipulation data is automatically imported into the runtime library according to a corresponding time sequence; and the imported manipulation data is transferred to the VR application in the initial running state by using the runtime library, for playback processing. Based on automatic playback processing, an operation of a user in history operations can be reproduced without requiring the user to re-operate from the beginning, thereby greatly improving operation efficiency, speed, and usability of the VR application.

In addition, the playback processing can be implemented without modifying a virtual application program, thereby achieving universal application, and avoiding problems relating to a cost and difficulties caused due to modification of each virtual application program.

In an embodiment, operation S308 includes: determining a playback manner corresponding to the VR application; shortening, when the playback manner is a first playback manner, according to an acceleration import multiple corresponding to the first playback manner, a record time interval of the manipulation data neighboring based on the time sequence; and importing the manipulation data sequentially into the runtime library according to the corresponding time sequence and the shortened record time interval.

Specifically, before importing the manipulation data into the runtime library, the terminal may determine the playback manner corresponding to the VR application that currently performs the playback processing. In an embodiment, the playback manner may include accelerated playback and/or restored playback. The accelerated playback means that a manipulation speed corresponding to the stored manipulation data is increased, to increase a playback speed. The restored playback means that restored playback processing is performed at a manipulation speed corresponding to the stored manipulation data.

It may be understood that, when the terminal generates corresponding manipulation data according to a user operation, the terminal records a time node generated by the manipulation data. The record time interval is a recorded interval between time nodes of the manipulation data neighboring based on the time sequence. For example, if a recorded time node of a previous piece of manipulation data is t1, and a recorded time node of a following piece of manipulation data is t2, a record time interval of the two pieces of neighboring manipulation data is t2−t1.

When the playback manner corresponding to the VR application is the first playback manner (namely, the accelerated playback), the terminal may obtain the acceleration import multiple corresponding to the first playback manner. The acceleration import multiple may be preset. The terminal shortens, according to the acceleration import multiple, the record time interval of the manipulation data neighboring based on the time sequence; and imports the manipulation data sequentially into the runtime library according to the corresponding time sequence and the shortened record time interval.

For example, if the acceleration import multiple is 2, and the record time interval of the two pieces of neighboring manipulation data arranged based on the time sequence is 0.02 second, the record time interval of the two pieces of manipulation data is shortened to 0.01 second, and then the manipulation data is sequentially imported into the runtime library according to the corresponding time sequence and the shortened record time interval of 0.01 second. Playback efficiency can be improved through accelerated import.

In an embodiment, the method further includes: obtaining, when the playback manner is a second playback manner, a time node corresponding to the manipulation data; and importing the manipulation data sequentially into the runtime library according to the corresponding time node.

When the playback manner corresponding to the VR application is the second playback manner (namely, the restored playback), the terminal may obtain the time node corresponding to the manipulation data, and import the manipulation data sequentially into the runtime library according to the corresponding time node. It may be understood that, the time node corresponding to the manipulation data is a stored time node at which the user performs an operation; and the manipulation data is imported sequentially into the runtime library according to the corresponding time node, to import the manipulation data into the runtime library at a manipulation speed used when the user previously performs an operation, that is, implement consistent restoration on the operation.

It should be noted that, "first" and "second" in the first playback manner and the second playback manner are merely used for distinguishing between different playback manners, and are not intended to constitute a limitation in aspects of a size, subordination, an order, or the like.

In the foregoing embodiment, before the stored manipulation data is imported into the runtime library, the playback manner corresponding to the VR application is determined, and the manipulation data is imported according to the corresponding playback manner, so that the playback manner is more accurate and valid, thereby improving the playback efficiency.

In an embodiment, the determining a playback manner corresponding to the VR application includes: determining, when virtual three-dimensional coordinates in the VR application and physical three-dimensional coordinates in physical space satisfy a one-to-one mapping relationship, that the playback manner corresponding to the VR application is the first playback manner.

The virtual three-dimensional coordinates are position coordinates corresponding to a character of the user in virtual three-dimensional space constructed in the VR application. The physical space refers to real three-dimensional space (or three-dimensional space in a real word. The physical three-dimensional coordinates are position coordinates of the user in the real three-dimensional space.

Specifically, the terminal determines whether the virtual three-dimensional coordinates in the VR application and the physical three-dimensional coordinates in the physical space satisfy the one-to-one mapping relationship. If the virtual three-dimensional coordinates and the physical three-dimensional coordinates satisfy the one-to-one mapping relationship, it indicates that a position of the user in the virtual three-dimensional space constructed in the VR application is determined based only on a position in the physical space, without involving constraints of manipulation data generated by an operation of the handle and/or the HMD and the corresponding time node, so that the terminal may determine that the VR application supports the accelerated import, that is, the terminal may determine that the playback manner corresponding to the VR application is the first playback manner (namely, the accelerated playback). It may be understood that, in another embodiment, for the VR application supporting the accelerated import, the terminal may not perform the accelerated import, but performs import into the runtime library in a normal import manner.

In an embodiment, the determining a playback manner corresponding to the VR application includes: determining, when virtual three-dimensional coordinates in the VR application and physical three-dimensional coordinates in physical space do not satisfy a one-to-one mapping relationship, that the playback manner corresponding to the VR application is the second playback manner.

Specifically, when the virtual three-dimensional coordinates in the VR application and the physical three-dimensional coordinates in the physical space do not satisfy the one-to-one mapping relationship, the terminal may determine that the VR application does not support the accelerated import, that is, determine that the playback manner corresponding to the VR application is the second playback manner (namely, the restored playback). In an embodiment, when the virtual three-dimensional coordinates in the VR application need to be determined by using the physical three-dimensional coordinates in the physical space and manipulation data generated by an operation of the handle, the HMD, and/or the like, and the corresponding time node, it indicates that the virtual three-dimensional coordinates in the VR application and the physical three-dimensional coordinates in the physical space do not satisfy the one-to-one mapping relationship.

In the foregoing embodiment, whether the virtual three-dimensional coordinates in the VR application and the physical three-dimensional coordinates in the physical space satisfy the one-to-one mapping relationship is determined, to determine the playback manner corresponding to the VR application. Accordingly, the playback manner can be more accurately determined, and playback is performed based on the accurate playback manner, thereby improving the playback efficiency.

In an embodiment, the method further includes an operation of performing blur processing on the playback picture, which specifically includes the following operations: obtaining a playback picture that is generated by the VR application according to the manipulation data; performing blur processing on the playback picture; and outputting and displaying a playback picture obtained after the blur processing.

Specifically, after transferring the stored manipulation data into the VR application by using the runtime library, the terminal may generate the corresponding playback picture by using the VR application according to the manipulation data.

In an embodiment, the terminal may determine the corresponding virtual three-dimensional coordinates by using the VR application according to the manipulation data, and generate the playback picture corresponding to the determined virtual three-dimensional coordinates. It may be understood that, for some VR applications (for example, a VR game application) needing to be continuously operated, a picture generated by the VR application corresponds to virtual three-dimensional coordinates in the virtual three-dimensional space, and pictures corresponding to different virtual three-dimensional coordinates in the virtual three-dimensional space are also different. For example, if the character of the user is walking forward in the virtual three-dimensional space, a corresponding picture also changes.

The terminal obtains the playback picture that is generated by the VR application according to the manipulation data, and performs the blur processing on the playback picture. Specifically, the terminal may implement the blur processing on the playback picture by reducing quality of the playback picture, or may implement the blur processing on the playback picture by superimposing a blurred graphic element onto the playback picture, for example, superimposing a mosaic layer. Herein, a specific implementation of performing the blur processing on the playback picture by the terminal is not limited, provided that the blur processing can be implemented on the playback picture. Further, the terminal may output and display the playback picture generated after the blur processing. That is, the terminal may send the playback picture obtained after the blur processing to the HMD for output and display. The user may see, through the HMD, the playback picture obtained after the blur processing.

In an embodiment, when the terminal imports the manipulation data sequentially into the runtime library according to the second playback manner (namely, the restored playback) and the corresponding time node, the operation of performing blur processing on the playback picture may be performed. It may be understood that, when the terminal imports the manipulation data by using the second playback manner, to perform the playback processing, the generated picture may cause the user to generate a vertigo feeling, and the blur processing is performed on the playback picture to avoid the vertigo feeling, thereby improving quality and an effective ratio of a playback operation.

In an embodiment, the method further includes: generating a picture of a third-party view of angle corresponding to the playback picture; and outputting the picture of the third-party view of angle, to superimpose the picture of the third-party view of angle onto the playback picture obtained after the blur processing, and a result of superimposition is displayed.

The playback picture that is generated by the VR application according to the manipulation data is a picture of a first-party view of angle. The terminal may generate a picture drawing parameter of the playback picture of the first-party view of angle through changing, to generate the picture of the third-party view of angle corresponding to the playback picture. It may be understood that, in the picture of the third-party view of angle, an image corresponding to the character of the user is a part of the picture of the third-party view of angle, while in the picture of the first-party view of angle, the character of the user is not displayed.

The terminal may output the generated picture of the third-party view of angle corresponding to the playback picture, to superimpose the picture of the third-party view of angle onto the playback picture obtained after the blur processing, and a result of superimposition is displayed. In this way, the user can be prevented from getting vertigo, and the user can see a current playback progress.

In an embodiment, the method further includes: receiving a playback stop instruction; and canceling, in response to the playback stop instruction, the blur processing performed on the playback picture, and canceling generation and output of the picture of the third-party view of angle corresponding to the playback picture.

The playback stop instruction is used for triggering stopping of execution logic for playback.

Specifically, the user may perform a tap operation, a press operation, or the like at any position in a playback process, to send the playback stop instruction. The terminal may receive the playback stop instruction that is initiated by the user at any position in the playback process. For example, all of manipulation data stored by the terminal for the playback processing may be played back for 30 seconds, but the user may not intend to play back all of the manipulation data and may initiate the playback stop instruction at any position before the entire playback process is completed. For example, when the manipulation data is played back for 20 seconds before the entire playback process of 30 seconds is completed, the user may tap or press a playback stop button to initiate the playback stop instruction.

The terminal may cancel, in response to the playback stop instruction, the blur processing performed on the playback picture, and cancel generation and output of the picture of the third-party view of angle corresponding to the playback picture. Specifically, the terminal may cancel blur processing on a playback picture at a position corresponding to the playback stop instruction, that is, the playback picture at the position corresponding to the playback stop instruction is a picture on which the blur processing is not performed and that can be normally output and displayed. In addition, the terminal may further cancel generation and output of the picture of the third-party view of angle corresponding to the playback picture. That is, after receiving the playback stop instruction, the terminal may not generate a picture of a third-party view of angle corresponding to the playback picture at the position corresponding to the playback stop instruction. That is, after the terminal responds to the playback stop instruction and performs the foregoing processing, the user finally sees, through the HMD, the playback picture on which the blur processing is not performed.

Figure 6:
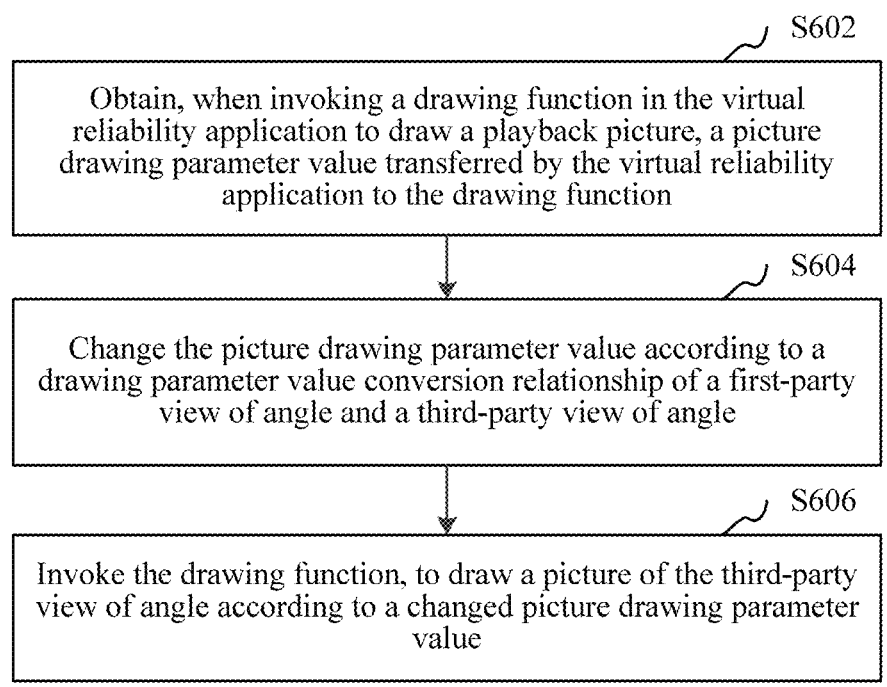
FIG. 6 is a schematic flowchart of an operation of generating a picture of a third-party view of angle according to an embodiment.

As shown in FIG. 6, in an embodiment, the generating a picture of a third-party view of angle corresponding to the playback picture (which is referred to as an operation of generating the picture of the third-party view of angle) specifically includes the following operations S602-S606:

S602: Obtain, when invoking a drawing function in the VR application to draw the playback picture, a picture drawing parameter value transferred by the VR application to the drawing function.

Specifically, after the terminal transfers the stored manipulation data to the VR application by using the runtime library, the VR application invokes the drawing function to draw the playback picture corresponding to the manipulation data. When the VR application invokes the drawing function to draw the playback picture, the terminal may obtain the picture drawing parameter value transferred by the VR application to the drawing function. The obtained picture drawing parameter value is used for drawing the picture of the first view of angle. It may be understood that, after obtaining the picture drawing parameter value transferred by the VR application to the drawing function, the terminal may continue to transfer the picture drawing parameter value to the drawing function, so that the drawing function generates the playback picture of the first view of angle according to the picture drawing parameter value.

S604: Change the picture drawing parameter value according to a drawing parameter value conversion relationship of a first-party view of angle and the third-party view of angle.

The drawing parameter value conversion relationship of the first-party view of angle and the third-party view of angle may be a drawing parameter value conversion rule for converting the picture of the first-party view of angle into the picture of the third-party view of angle. The terminal may change, according to the drawing parameter value conversion rule of the first-party view of angle and the third-party view of angle, the obtained picture drawing parameter value used for drawing the picture of the first view of angle into a picture drawing parameter value used for drawing the picture of the third view of angle.

S606: Invoke the drawing function, to draw the picture of the third-party view of angle according to a changed picture drawing parameter value.

Specifically, the terminal may invoke the drawing function, to draw the picture of the third-party view of angle according to the changed picture drawing parameter value (namely, the picture drawing parameter value used for drawing the picture of the third view of angle).

In the foregoing embodiment, the picture of the third-party view of angle is generated by obtaining and changing the picture drawing parameter value, so that the picture of the third-party view of angle can be generated with significant convenience and improved efficiency.

In an embodiment, operation S602 includes: obtaining, when invoking the drawing function in the VR application to draw the playback picture, by using a hook function injected into the drawing function, the picture drawing parameter value transferred by the VR application to the drawing function; and operation S606 includes: invoking the drawing function by using the hook function injected into the drawing function, to draw the picture of the third-party view of angle according to the changed picture drawing parameter value.

Specifically, when receiving the playback instruction, the terminal triggers injection of the hook function into the drawing function. When the VR application invokes the drawing function to draw the playback picture, the terminal may obtain, by using the hook function injected into the drawing function, the picture drawing parameter value transferred by the VR application to the drawing function.

After the obtained picture drawing parameter value is changed completely, the terminal may invoke the corresponding drawing function again by using the hook function injected into the drawing function, to draw the picture of the third-party view of angle according to the changed picture drawing parameter value.

In the foregoing embodiment, the picture drawing parameter value is obtained and changed by using the hook function injected into the drawing function, to generate the picture of the third-party view of angle. Accordingly, the picture of the third-party view of angle can be generated with significant convenience and improved efficiency.

Figure 7:
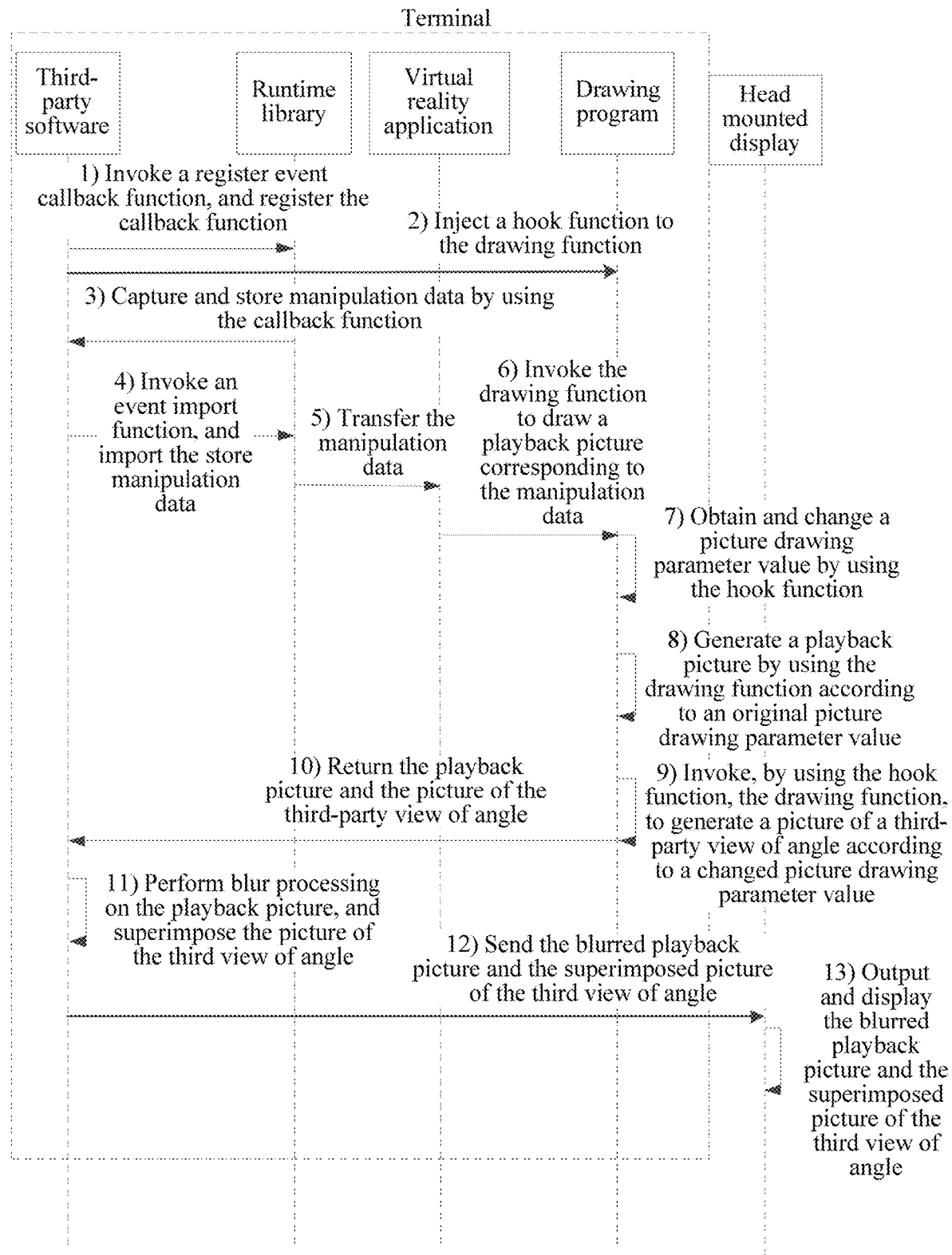
FIG. 7 is a diagram of a time sequence of a VR application data processing method according to an embodiment.

It may be understood that, the terminal implements the VR application data processing method in this embodiment by using third-party software run on the terminal. FIG. 7 is a diagram of a time sequence of the VR application data processing method according to an embodiment. The method specifically includes the following operations:

1) Third-party software invokes the register event callback function in the runtime library, to register the callback function with the runtime library.

2) The third-party software injects a hook function to a drawing function in a drawing program.

3) The third-party software captures and stores, by using the callback function, manipulation data sent by the VR operation hardware to the runtime library.

4) The third-party software invokes the event import function in the runtime library, to import the stored manipulation data into the runtime library.

5) The runtime library transfers the imported manipulation data to the VR application.

6) The VR application invokes the drawing function in the drawing program, to draw a playback picture corresponding to the manipulation data.

7) Obtain and change a picture drawing parameter value by using the hook function injected into the drawing function in the drawing program.

8) Generate a playback picture by using the drawing function in the drawing program according to an original picture drawing parameter value.

9) Invoke the drawing function by using the hook function injected into the drawing function in the drawing program, to generate a picture of a third-party view of angle according to a changed picture drawing parameter value.

10) The drawing program returns the playback picture and the picture of the third-party view of angle to the third-party software.

11) The third-party software performs blur processing on the playback picture, and superimposes the picture of the third view of angle.

12) The third-party software sends the blurred playback picture and the superimposed picture of the third view of angle to the HMD.

13) The HMD outputs and displays the blurred playback picture and the superimposed picture of the third view of angle.

Figure 8:
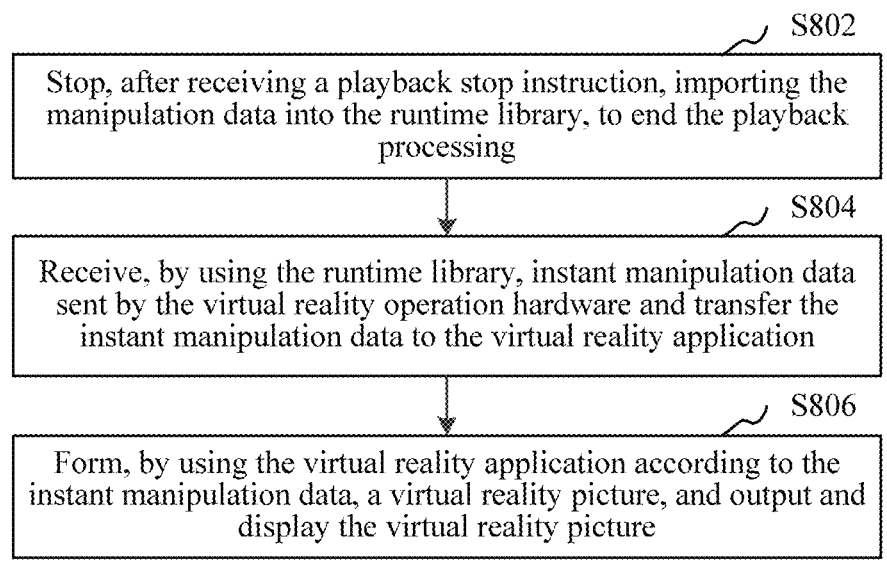
FIG. 8 is a schematic flowchart of an operation of generating an instant VR picture according to an embodiment.

As shown in FIG. 8, in an embodiment, the method further includes an operation of generating an instant VR picture, which specifically includes the following operations S802-S806:

S802: Stop, after receiving a playback stop instruction, importing the manipulation data into the runtime library, to end the playback processing.

The playback stop instruction is used for triggering stopping of the execution logic for playback.

Specifically, the user may perform a tap operation, a press operation, or the like at any position in a playback process, to send the playback stop instruction. The terminal may receive the playback stop instruction that is initiated by the user at any position in the playback process. For example, all of manipulation data stored by the terminal may be played back for 30 seconds in the playback processing, but the user may not intend to play back all of the manipulation data and initiate the playback stop instruction at any position before the entire playback process of 30 seconds is completed. For example, when the manipulation data is played back for 20 seconds, the user may tap or press a playback stop button to initiate the playback stop instruction.

The terminal stops, after receiving the playback stop instruction, importing the manipulation data into the runtime library, to end the playback processing. It may be understood that, after the playback processing ends, an instant operation processing state is restored, and the terminal may control the runtime library to restore to a state in which instant manipulation data sent by the VR operation hardware can be received.

S804: Receive, by using the runtime library, instant manipulation data sent by the VR operation hardware, and transfer the instant manipulation data to the VR application.

Specifically, the user may operate the VR operation hardware to initiate an instant operation on the VR application. The VR operation hardware sends instant manipulation data corresponding to the instant operation to the runtime library. The terminal receives, by using the runtime library, the instant manipulation data sent by the VR operation hardware, and transfers the instant manipulation data to the VR application.

S806: Form a VR picture by using the VR application according to the instant manipulation data, and output and display the VR picture.

Specifically, the terminal may form the VR picture by using the VR application according to the instant manipulation data, and output and display the VR picture. In an embodiment, the terminal may determine corresponding virtual three-dimensional coordinates by using the VR application according to the instant manipulation data, and generate an instant VR picture corresponding to the determined virtual three-dimensional coordinates.

In the foregoing embodiment, after the playback stop instruction is received, the instant operation processing state can be restored, and the VR picture is formed according to the instant manipulation data sent by the VR operation hardware, and is output and displayed, to implement a seamless connection between playback and instant operations. Accordingly, another operation for restoring the instant operation state is not needed, thereby improving the operation efficiency.

Figure 9:
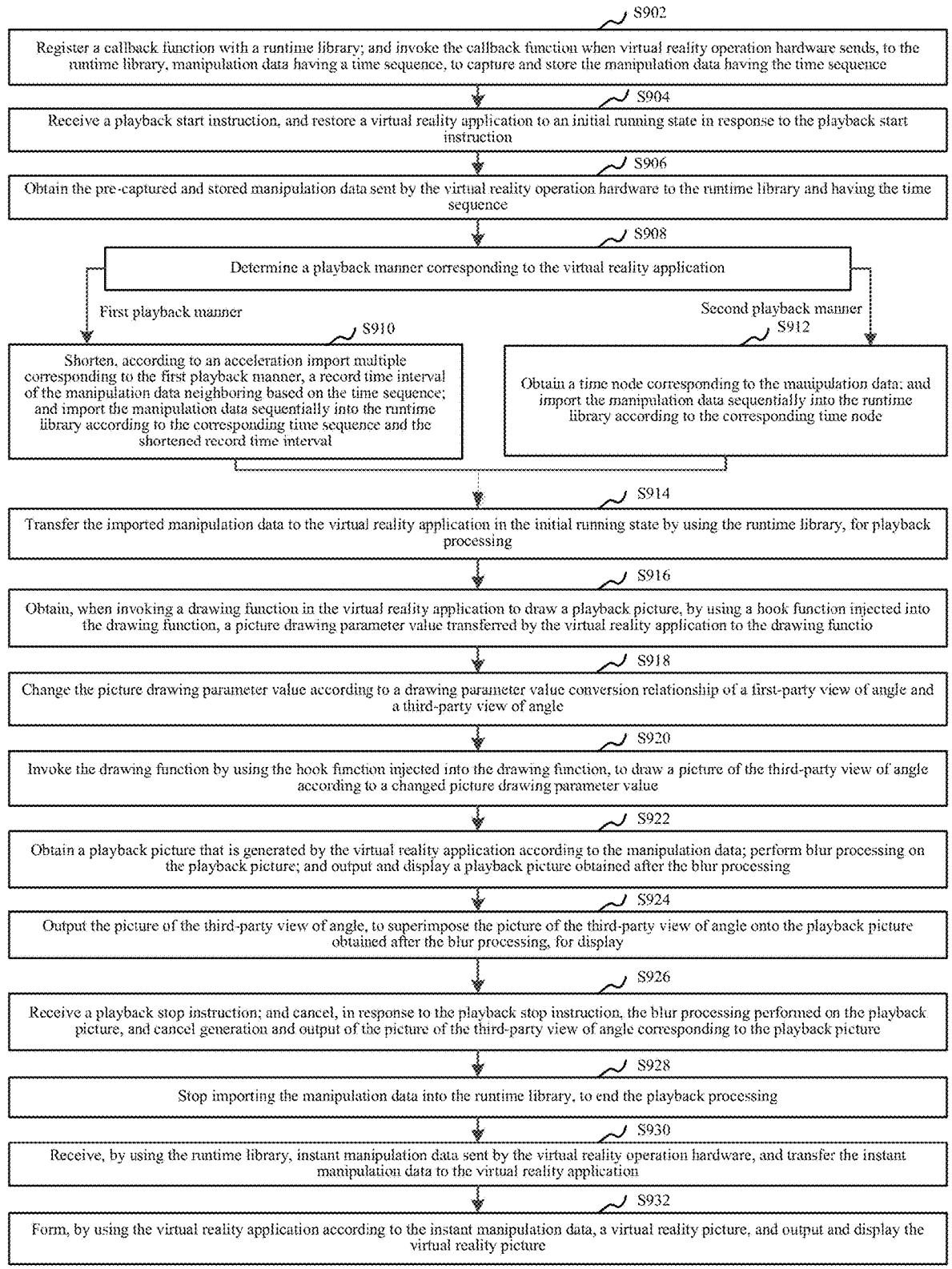
FIG. 9 is a schematic flowchart of a VR application data processing method according to another embodiment.

As shown in FIG. 9, in an embodiment, another VR application data processing method is provided. The method specifically includes the following operations:

S902: Register a callback function with a runtime library; and invoke the callback function when VR operation hardware sends, to the runtime library, manipulation data having a time sequence, to capture and store the manipulation data having the time sequence.

S904: Receive a playback start instruction, and restore a VR application to an initial running state in response to the playback start instruction.

S906: Obtain the pre-captured and stored manipulation data, sent by the VR operation hardware to the runtime library and having the time sequence.

S908: Determine a playback manner corresponding to the VR application. When the playback manner is a first playback manner, proceed to operation S910; or when the playback manner is a second playback manner, proceed to operation S912.

When virtual three-dimensional coordinates in the VR application and physical three-dimensional coordinates in physical space satisfy a one-to-one mapping relationship, it is determined that the playback manner corresponding to the VR application is the first playback manner. When virtual three-dimensional coordinates in the VR application and physical three-dimensional coordinates in physical space do not satisfy a one-to-one mapping relationship, it is determined that the playback manner corresponding to the VR application is the second playback manner.

S910: Shorten, according to an acceleration import multiple corresponding to the first playback manner, a record time interval of the manipulation data neighboring based on the time sequence; and import the manipulation data sequentially into the runtime library according to the corresponding time sequence and the shortened record time interval.

S912: obtain a time node corresponding to the manipulation data; and import the manipulation data sequentially into the runtime library according to the corresponding time node.

S914: Transfer the imported manipulation data to the VR application in the initial running state by using the runtime library, for playback processing.

S916: Obtain, when invoking a drawing function in the VR application to draw a playback picture, by using a hook function injected into the drawing function, a picture drawing parameter value transferred by the VR application to the drawing function.

S918: Change the picture drawing parameter value according to a drawing parameter value conversion relationship of a first-party view of angle and a third-party view of angle.

S920: Invoke the drawing function by using the hook function injected into the drawing function, to draw a picture of the third-party view of angle according to a changed picture drawing parameter value.

S922: Obtain a playback picture that is generated by the VR application according to the manipulation data; and perform blur processing on the playback picture, and output and display a playback picture obtained after the blur processing.

S924: Output the picture of the third-party view of angle, to superimpose the picture of the third-party view of angle onto the playback picture obtained after the blur processing, for display.

S926: Receive a playback stop instruction; and cancel, in response to the playback stop instruction, the blur processing performed on the playback picture, and cancel generation and output of the picture of the third-party view of angle corresponding to the playback picture.

S928: Stop importing the manipulation data into the runtime library, to end the playback processing.

S930: Receive, by using the runtime library, instant manipulation data sent by the VR operation hardware, and transfer the instant manipulation data to the VR application.

S932: Form a VR picture by using the VR application according to the instant manipulation data, and output and display the VR picture.

According to the foregoing VR application data processing method, manipulation data, sent by VR operation hardware to a runtime library and having a time sequence, is pre-captured and stored; a VR application is restored to an initial running state when a playback start instruction is received; the pre-captured and stored manipulation data is automatically imported into the runtime library according to a corresponding time sequence; and the imported manipulation data is transferred to the VR application in the initial running state by using the runtime library, for playback processing. Based on automatic playback processing, an operation of a user in history operations can be reproduced without requiring the user to re-operate from the beginning, thereby greatly improving operation efficiency.

Second, before the stored manipulation data is imported into the runtime library, the playback manner corresponding to the VR application is determined, and the manipulation data is imported according to the corresponding playback manner, so that the playback manner is more accurate and valid, thereby improving the playback efficiency. In addition, the playback efficiency can be further improved through the accelerated import.

Then the blur processing is performed on the playback picture to avoid a vertigo feeling, thereby improving quality and an effective ratio of a playback operation.

Further, the picture of the third-party view of angle is superimposed onto the playback picture obtained after the blur processing for display. In this way, the user can be prevented from getting vertigo, and the user can see a current playback progress.

In addition, the picture of the third-party view of angle is generated by obtaining and changing the picture drawing parameter value, so that the picture of the third-party view of angle can be generated with significant convenience and improved efficiency.

Finally, after the playback stop instruction is received, the instant operation processing state can be restored, and the VR picture is formed according to the instant manipulation data sent by the VR operation hardware, and is output and displayed, to implement a seamless connection between playback and instant operations, avoiding a need to restore to the instant operation state by using another operation, and improving the operation efficiency.

In an embodiment, a terminal is further provided. An internal structure of the terminal may be shown in FIG. 2. The terminal includes a VR application data processing apparatus, the VR application data processing apparatus includes various modules, and a part or all of each module may be implemented by using software, hardware, or a combination thereof.

Figure 10:
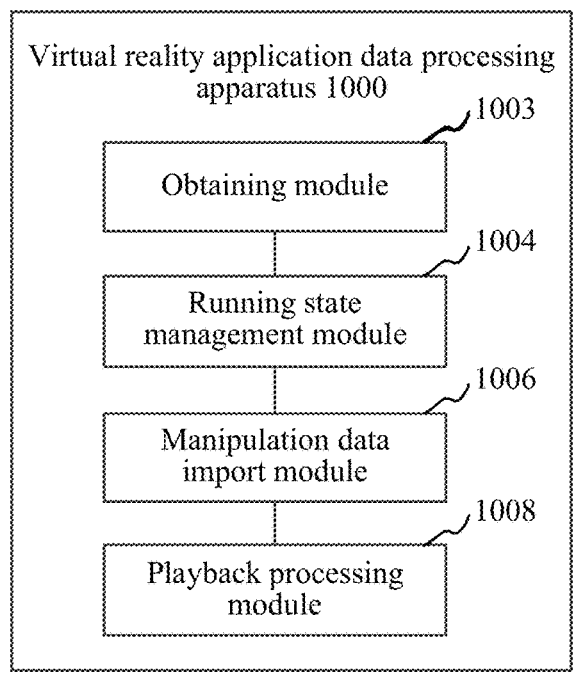
FIG. 10 is a block diagram of a VR application data processing apparatus according to an embodiment.

As shown in FIG. 10, in an embodiment, a VR application data processing apparatus 1000 is provided. The apparatus 1000 includes an obtaining module 1003, a running state management module 1004, a manipulation data import module 1006, and a playback processing module 1008.

The obtaining module 1003 is configured to receive a playback start instruction.

The running state management module 1004 is configured to restore a VR application to an initial running state in response to the playback start instruction.

The obtaining module 1003 is further configured to obtain pre-captured and stored manipulation data, sent by VR operation hardware to a runtime library and having a time sequence.

The manipulation data import module 1006 is configured to import the manipulation data into the runtime library according to the corresponding time sequence.

The playback processing module 1008 is configured to transfer the imported manipulation data to the VR application in the initial running state by using the runtime library, for playback processing.

Figure 11:
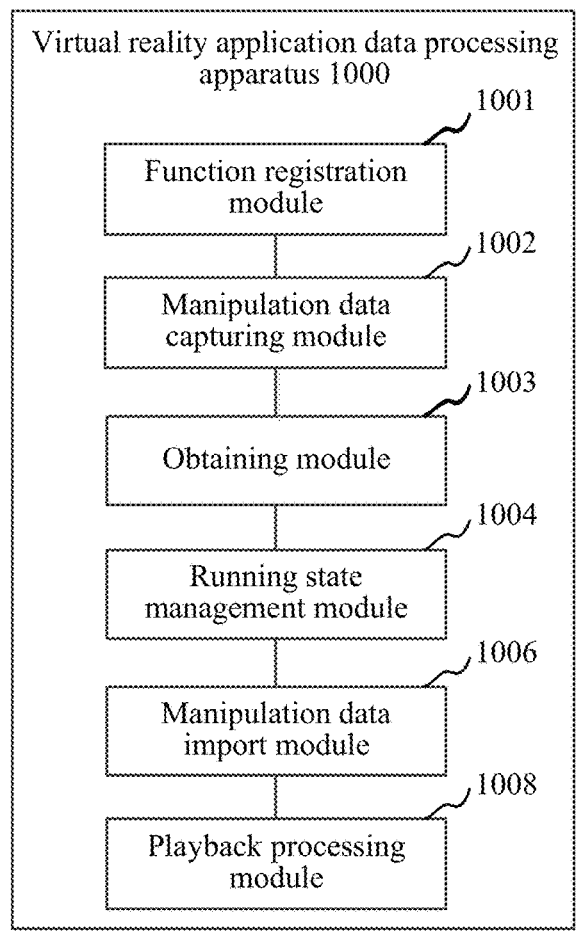
FIG. 11 is a block diagram of a VR application data processing apparatus according to another embodiment.

As shown in FIG. 11, in an embodiment, the apparatus 1000 further includes:

a function registration module 1001, configured to register a callback function with the runtime library; and a manipulation data capturing module 1002, configured to invoke the callback function when the VR operation hardware sends, to the runtime library, the manipulation data having the time sequence, to capture and store the manipulation data having the time sequence.

In an embodiment, the manipulation data import module 1006 is further configured to: determine a playback manner corresponding to the VR application; shorten, when the playback manner is a first playback manner, according to an acceleration import multiple corresponding to the first playback manner, a record time interval of the manipulation data neighboring based on the time sequence; and import the manipulation data sequentially into the runtime library according to the corresponding time sequence and the shortened record time interval.

In an embodiment, the manipulation data import module 1006 is further configured to determine a playback manner corresponding to the VR application; obtain, when the playback manner is a second playback manner, a time node corresponding to the manipulation data; and import the manipulation data sequentially into the runtime library according to the corresponding time node.

In an embodiment, the manipulation data import module 1006 is further configured to determine, when virtual three-dimensional coordinates in the VR application and physical three-dimensional coordinates in physical space satisfy a one-to-one mapping relationship, that the playback manner corresponding to the VR application is the first playback manner.

In an embodiment, the manipulation data import module 1006 is further configured to determine, when virtual three-dimensional coordinates in the VR application and physical three-dimensional coordinates in physical space do not satisfy a one-to-one mapping relationship, that the playback manner corresponding to the VR application is the second playback manner.

Figure 12:
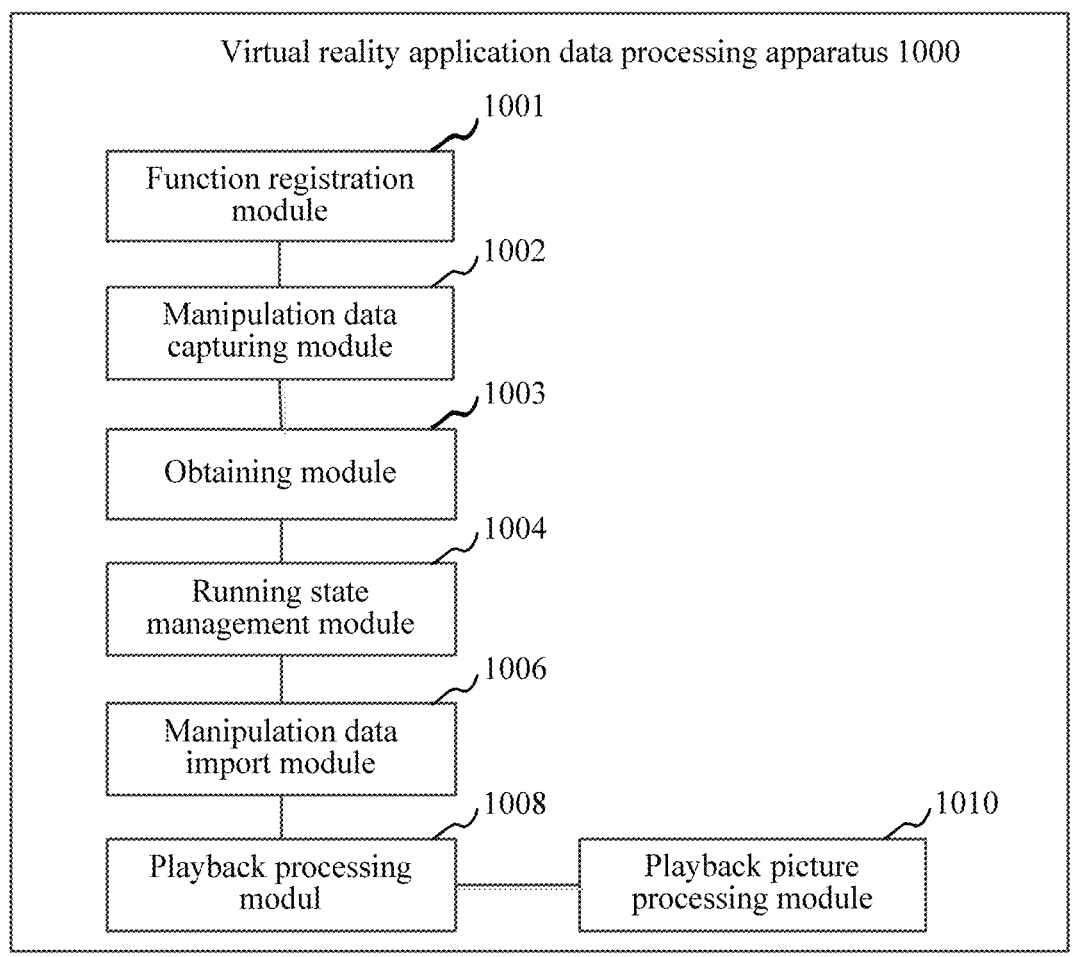
FIG. 12 is a block diagram of a VR application data processing apparatus according to still another embodiment.

As shown in FIG. 12, in an embodiment, the apparatus 1000 further includes:

a playback picture processing module 1010, configured to obtain a playback picture that is generated by the VR application according to the manipulation data; perform blur processing on the playback picture; and output and display a playback picture obtained after the blur processing.

In an embodiment, the playback picture processing module 1010 is further configured to: generate a picture of a third-party view of angle corresponding to the playback picture; and output the picture of the third-party view of angle, to superimpose the picture of the third-party view of angle onto the playback picture obtained after the blur processing, for display.

In an embodiment, the playback picture processing module 1010 is further configured to: receive a playback stop instruction; and cancel, in response to the playback stop instruction, the blur processing performed on the playback picture, and cancel generation and output of the picture of the third-party view of angle corresponding to the playback picture.

In an embodiment, the playback picture processing module 1010 is further configured to: obtain, when invoking a drawing function in the VR application to draw the playback picture, a picture drawing parameter value transferred by the VR application to the drawing function; change the picture drawing parameter value according to a drawing parameter value conversion relationship of a first-party view of angle and the third-party view of angle; and invoke the drawing function, to draw the picture of the third-party view of angle according to a changed picture drawing parameter value.

In an embodiment, the playback picture processing module 1010 is further configured to obtain, when invoking the drawing function in the VR application to draw the playback picture, by using a hook function injected into the drawing function, the picture drawing parameter value transferred by the VR application to the drawing function.

The playback picture processing module 1010 is further configured to invoke the drawing function by using the hook function injected into the drawing function, to draw the picture of the third-party view of angle according to the changed picture drawing parameter value.

Figure 13:
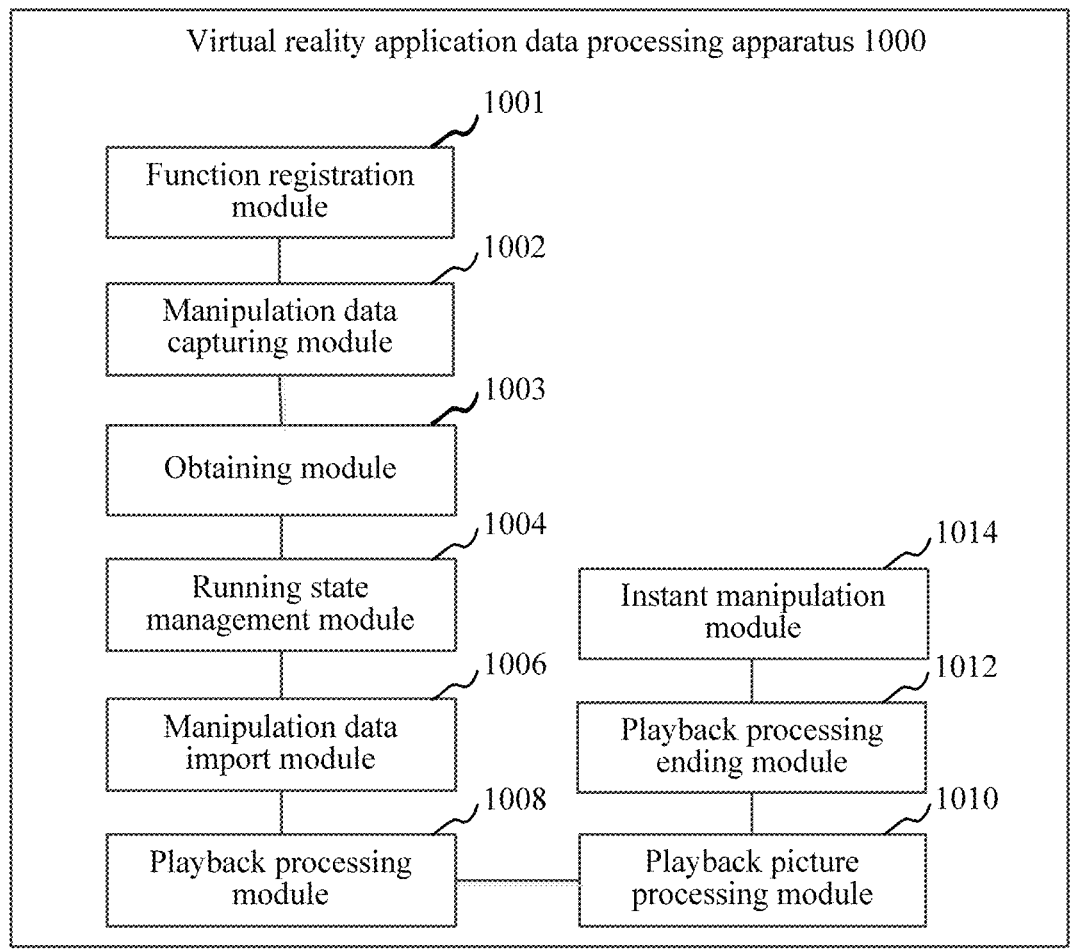
FIG. 13 is a block diagram of a VR application data processing apparatus according to yet another embodiment.

As shown in FIG. 13, in an embodiment, the apparatus 1000 further includes:

a playback processing ending module 1012, configured to stop, after receiving a playback stop instruction, importing the manipulation data into the runtime library, to end the playback processing; and an instant manipulation module 1014, configured to: receive, by using the runtime library, instant manipulation data sent by the VR operation hardware, and transfer the instant manipulation data to the VR application; and form a VR picture by using the VR application according to the instant manipulation data, and output and display the VR picture.

In an embodiment, a computer device is provided. The computer device includes a memory and a processor, the memory storing a computer-readable instruction, and when the computer-readable instruction is executed by the processor, the processor being caused to perform the following operations: receiving a playback start instruction; restoring a VR application to an initial running state in response to the playback start instruction; obtaining pre-captured and stored manipulation data, sent by VR operation hardware to a runtime library and having a time sequence; importing the manipulation data into the runtime library according to the corresponding time sequence; and transferring the imported manipulation data to the VR application in the initial running state by using the runtime library, for playback processing.

In an embodiment, before the receiving a playback start instruction, the computer-readable instruction further causes the processor to perform the following operations: registering a callback function with the runtime library; and invoking the callback function when the VR operation hardware sends, to the runtime library, the manipulation data having the time sequence, to capture and store the manipulation data having the time sequence.

In an embodiment, the importing the manipulation data into the runtime library according to the corresponding time sequence that is performed by the processor includes: determining a playback manner corresponding to the VR application; shortening, when the playback manner is a first playback manner, according to an acceleration import multiple corresponding to the first playback manner, a record time interval of the manipulation data neighboring based on the time sequence; and importing the manipulation data sequentially into the runtime library according to the corresponding time sequence and the shortened record time interval.

In an embodiment, the computer-readable instruction further causes the processor to perform the following operations: determining a playback manner corresponding to the VR application; obtaining, when the playback manner is a second playback manner, a time node corresponding to the manipulation data; and importing the manipulation data sequentially into the runtime library according to the corresponding time node.

In an embodiment, the determining a playback manner corresponding to the VR application that is performed by the processor includes: determining, when virtual three-dimensional coordinates in the VR application and physical three-dimensional coordinates in physical space satisfy a one-to-one mapping relationship, that the playback manner corresponding to the VR application is the first playback manner.

In an embodiment, the determining a playback manner corresponding to the VR application that is performed by the processor includes: determining, when virtual three-dimensional coordinates in the VR application and physical three-dimensional coordinates in physical space do not satisfy a one-to-one mapping relationship, that the playback manner corresponding to the VR application is the second playback manner.

In an embodiment, the computer-readable instruction further causes the processor to perform the following operations: obtaining a playback picture that is generated by the VR application according to the manipulation data; performing blur processing on the playback picture; and outputting and displaying a playback picture obtained after the blur processing.

In an embodiment, the computer-readable instruction further causes the processor to perform the following operations: generating a picture of a third-party view of angle corresponding to the playback picture; and outputting the picture of the third-party view of angle, to superimpose the picture of the third-party view of angle onto the playback picture obtained after the blur processing, for display.

In an embodiment, the computer-readable instruction further causes the processor to perform the following operations: receiving a playback stop instruction; and canceling, in response to the playback stop instruction, the blur processing performed on the playback picture, and canceling generation and output of the picture of the third-party view of angle corresponding to the playback picture.

In an embodiment, the generating a picture of a third-party view of angle corresponding to the playback picture that is performed by the processor includes: obtaining, when invoking a drawing function in the VR application to draw the playback picture, a picture drawing parameter value transferred by the VR application to the drawing function; changing the picture drawing parameter value according to a drawing parameter value conversion relationship of a first-party view of angle and the third-party view of angle; and invoking the drawing function, to draw the picture of the third-party view of angle according to a changed picture drawing parameter value.

In an embodiment, the obtaining, when invoking a drawing function in the VR application to draw the playback picture, a picture drawing parameter value transferred by the VR application to the drawing function that is performed by the processor includes: obtaining, when invoking the drawing function in the VR application to draw the playback picture, by using a hook function injected into the drawing function, the picture drawing parameter value transferred by the VR application to the drawing function.

The invoking the drawing function, to draw the picture of the third-party view of angle according to a changed picture drawing parameter value that is performed by the processor includes: invoking the drawing function by using the hook function injected into the drawing function, to draw the picture of the third-party view of angle according to the changed picture drawing parameter value.

In an embodiment, the computer-readable instruction further causes the processor to perform the following operations: stopping, after receiving a playback stop instruction, importing the manipulation data into the runtime library, to end the playback processing; receiving, by using the runtime library, instant manipulation data sent by the VR operation hardware, and transferring the instant manipulation data to the VR application; and forming a VR picture by using the VR application according to the instant manipulation data, and outputting and displaying the VR picture.

In an embodiment, a storage medium storing a computer-readable instruction is provided. When the computer-readable instruction is executed by one or more processors, the one or more processors are caused to perform the following operations: receiving a playback start instruction; restoring a VR application to an initial running state in response to the playback start instruction; obtaining pre-captured and stored manipulation data, sent by VR operation hardware to a runtime library and having a time sequence; importing the manipulation data into the runtime library according to the corresponding time sequence; and transferring the imported manipulation data to the VR application in the initial running state by using the runtime library, for playback processing.

In an embodiment, before the receiving a playback start instruction, the computer-readable instruction further causes the processor to perform the following operations: registering a callback function with the runtime library; and invoking the callback function when the VR operation hardware sends, to the runtime library, the manipulation data having the time sequence, to capture and store the manipulation data having the time sequence.

In an embodiment, the importing the manipulation data into the runtime library according to the corresponding time sequence that is performed by the processor includes: determining a playback manner corresponding to the VR application; shortening, when the playback manner is a first playback manner, according to an acceleration import multiple corresponding to the first playback manner, a record time interval of the manipulation data neighboring based on the time sequence; and importing the manipulation data sequentially into the runtime library according to the corresponding time sequence and the shortened record time interval.

In an embodiment, the computer-readable instruction further causes the processor to perform the following operations: determining a playback manner corresponding to the VR application; obtaining, when the playback manner is a second playback manner, a time node corresponding to the manipulation data; and importing the manipulation data sequentially into the runtime library according to the corresponding time node.

In an embodiment, the determining a playback manner corresponding to the VR application that is performed by the processor includes: determining, when virtual three-dimensional coordinates in the VR application and physical three-dimensional coordinates in physical space satisfy a one-to-one mapping relationship, that the playback manner corresponding to the VR application is the first playback manner.

In an embodiment, the determining a playback manner corresponding to the VR application that is performed by the processor includes: determining, when virtual three-dimensional coordinates in the VR application and physical three-dimensional coordinates in physical space do not satisfy a one-to-one mapping relationship, that the playback manner corresponding to the VR application is the second playback manner.

In an embodiment, the computer-readable instruction further causes the processor to perform the following operations: obtaining a playback picture that is generated by the VR application according to the manipulation data; performing blur processing on the playback picture; and outputting and displaying a playback picture obtained after the blur processing.

In an embodiment, the computer-readable instruction further causes the processor to perform the following operations: generating a picture of a third-party view of angle corresponding to the playback picture; and outputting the picture of the third-party view of angle, to superimpose the picture of the third-party view of angle onto the playback picture obtained after the blur processing, for display.

In an embodiment, the computer-readable instruction further causes the processor to perform the following operations: receiving a playback stop instruction; and canceling, in response to the playback stop instruction, the blur processing performed on the playback picture, and canceling generation and output of the picture of the third-party view of angle corresponding to the playback picture.

In an embodiment, the generating a picture of a third-party view of angle corresponding to the playback picture that is performed by the processor includes: obtaining, when invoking a drawing function in the VR application to draw the playback picture, a picture drawing parameter value transferred by the VR application to the drawing function; changing the picture drawing parameter value according to a drawing parameter value conversion relationship of a first-party view of angle and the third-party view of angle; and invoking the drawing function, to draw the picture of the third-party view of angle according to a changed picture drawing parameter value.

In an embodiment, the obtaining, when invoking a drawing function in the VR application to draw the playback picture, a picture drawing parameter value transferred by the VR application to the drawing function that is performed by the processor includes: obtaining, when invoking the drawing function in the VR application to draw the playback picture, by using a hook function injected into the drawing function, the picture drawing parameter value transferred by the VR application to the drawing function.

The invoking the drawing function, to draw the picture of the third-party view of angle according to a changed picture drawing parameter value that is performed by the processor includes: invoking the drawing function by using the hook function injected into the drawing function, to draw the picture of the third-party view of angle according to the changed picture drawing parameter value.

In an embodiment, the computer-readable instruction further causes the processor to perform the following operations: stopping, after receiving a playback stop instruction, importing the manipulation data into the runtime library, to end the playback processing; receiving, by using the runtime library, instant manipulation data sent by the VR operation hardware, and transferring the instant manipulation data to the VR application; and forming a VR picture by using the VR application according to the instant manipulation data, and outputting and displaying the VR picture.

It should be understood that although the operations in the embodiments of the disclosure are not necessarily performed in an order indicated by the operation numbers. Unless explicitly stated in this specification, the execution of these operations is not strictly sequential, and these operations may be executed in another sequence. Moreover, at least some of the operations in each embodiment may include a plurality of sub-operations or stages, which may not necessarily be completed at the same moment, but may be performed at different moments. These sub-operations or stages are not necessarily performed in sequence, but may be performed in turn or alternately with at least some of other operations or sub-operations or stages of the other operations.

A person of ordinary skill in the art would understand that all or some of the processes of the methods in the foregoing embodiments may be implemented by a computer program instructing relevant hardware. The program may be stored in a non-volatile computer-readable storage medium. When the program is run, the processes of the foregoing methods in the embodiments are performed. Any reference to a memory, a storage, a database or another medium used in the various embodiments may include a non-volatile and/or a volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external high-speed cache. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory bus (Rambus) direct RAM (RDRAM), a direct memory bus dynamic RAM (DRDRAM), and a memory bus dynamic RAM (RDRAM).

The technical features of the foregoing embodiments may be randomly combined. For the purpose of concise descriptions, not all possible combinations of the technical features in the foregoing embodiments are described, but as long as combinations of the technical features do not conflict each other, the combinations of the technical features should be considered as falling within the scope of this specification.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A method of processing data in a virtual reality (VR) application, performed by a computing device comprising at least one processor, comprising:
   restoring, by at least one of the at least one processor, the VR application to an initial running state in response to receiving a playback start instruction;
   obtaining, by at least one of the at least one processor, manipulation data that are transmitted to a runtime library to be pre-captured and stored, the manipulation data having a time sequence and being used to control running of the VR application;
   importing, by at least one of the at least one processor, the manipulation data into the runtime library based on the time sequence; and
   transferring, by at least one of the at least one processor, the imported manipulation data to the VR application in the initial running state by using the runtime library and performing playback processing based on the transferred manipulation data,
   wherein the method further comprises:
   obtaining, by at least one of the at least one processor, a playback picture that is generated by the VR application based on the manipulation data, the playback picture being a picture of a first-party view of angle based on a picture drawing parameter value transferred by the VR application to a drawing function in the VR application;

changing, by at least one of the at least one processor, the picture drawing parameter value based on a drawing parameter value conversion relationship of the first-party view of angle and a third-party view of angle;

invoking, by at least one of the at least one processor, the drawing function, to draw a picture of the third-party view of angle based on the changed picture drawing parameter value; and displaying, by at least one of the at least one processor, the picture of the third-party view of angle, to superimpose the picture of the third-party view of angle onto the playback picture.

2. The method according to claim 1, further comprising:
registering, by at least one of the at least one processor, a callback function with the runtime library; and
invoking, by at least one of the at least one processor, the callback function in response to receiving the manipulation data, to capture and store the manipulation data.

3. The method according to claim 1, wherein the importing comprises:
in response to determining that a playback manner being a first playback manner, shortening, by at least one of the at least one processor, a record time interval between manipulation data, neighboring based on the time sequence, based on an acceleration import multiple corresponding to the first playback manner; and
importing, by at least one of the at least one processor, the manipulation data sequentially into the runtime library based on the time sequence and the shortened record time interval.

4. The method according to claim 1, further comprising:
in response to determining that a playback manner being a second playback manner, obtaining, by at least one of the at least one processor, a time node corresponding to the manipulation data; and
importing, by at least one of the at least one processor, the manipulation data sequentially into the runtime library based on the obtained time node.

5. The method according to claim 3, further comprising:
determining, by at least one of the at least one processor, that the playback manner is the first playback manner based on a one-to-one mapping relationship between virtual three-dimensional coordinates in the VR application and physical three-dimensional coordinates in physical space.

6. The method according to claim 4, further comprising:
determining, by at least one of the at least one processor, that the playback manner is the second playback manner in response to virtual three-dimensional coordinates in the VR application and physical three-dimensional coordinates in physical space not satisfying a one-to-one mapping relationship.

7. The method according to claim 1, wherein the displaying comprises:
performing, by at least one of the at least one processor, blur processing on the playback picture; and
displaying, by at least one of the at least one processor, the playback picture on which the blur processing is performed.

8. The method according to claim 7,
wherein the picture of the third-party view of angle is superimposed onto the playback picture on which the blur processing is performed.

9. The method according to claim 1, further comprising:
in response to receiving a playback stop instruction, stopping, by at least one of the at least one processor, importing the manipulation data into the runtime library, to end the playback processing;
receiving, by at least one of the at least one processor by using the runtime library, instant manipulation data, and transferring the instant manipulation data to the VR application; and
generating, by at least one of the at least one processor, a VR picture by using the VR application based on the instant manipulation data, and displaying the VR picture.

10. A computer device, comprising:
at least one memory operable to store program code; and
at least one processor operable to read the program code and operate as instructed by the program code, the program code comprising:
restoring code configured to cause at least one of the at least one processor to restore the VR application to an initial running state in response to receiving a playback start instruction;
first obtaining code configured to cause at least one of the at least one processor to obtain manipulation data that are transmitted to a runtime library to be pre-captured and stored, the manipulation data having a time sequence and being used to control running of the VR application;
first importing code configured to cause at least one of the at least one processor to import the manipulation data into the runtime library based on the time sequence; and
transferring code configured to cause at least one of the at least one processor to transfer the imported manipulation data to the VR application in the initial running state by using the runtime library and performing playback processing based on the transferred manipulation data, wherein the program code further comprises:
playback picture obtaining code configured to cause at least one of the at least one processor to obtain a playback picture that is generated by the VR application based on the manipulation data, the playback picture being a picture of a first-party view of angle based on a picture drawing parameter value transferred by the VR application to a drawing function in the VR application;
changing code configured to cause at least one of the at least one processor to change the picture drawing parameter value based on a drawing parameter value conversion relationship of the first-party view of angle and a third-party view of angle;
first invoking code configured to cause at least one of the at least one processor to invoke the drawing function, to draw a picture of the third-party view of angle based on the changed picture drawing parameter value; and
displaying code configured to cause at least one of the at least one processor to display the picture of the third-party view of angle, to superimpose the picture of the third-party view of angle onto the playback picture.

11. The computer device according to claim 10, wherein the program code further comprises:
registering code configured to cause at least one of the at least one processor to register a callback function with the runtime library; and
second invoking code configured to cause at least one of the at least one processor to invoke the callback function in response to receiving the manipulation data, to capture and store the manipulation data.

12. The computer device according to claim 10, wherein the first importing code comprises:

shortening code configured to cause at least one of the at least one processor to, in response to determining that a playback manner being a first playback manner, shorten a record time interval between manipulation data, neighboring based on the time sequence, based on an acceleration import multiple corresponding to the first playback manner; and importing code configured to cause at least one of the at least one processor to import the manipulation data sequentially into the runtime library based on the time sequence and the shortened record time interval.

13. The computer device according to claim 10, wherein the program code further comprises:

second obtaining code configured to cause at least one of the at least one processor to obtain, in response to determining that a playback manner being a second playback manner, a time node corresponding to the manipulation data; and second importing code configured to cause at least one of the at least one processor to import the manipulation data sequentially into the runtime library based on the obtained time node.

14. The computer device according to claim 10, wherein the displaying code is configured to cause at least one of the at least one processor to perform blur processing on the playback picture, and display the playback picture on which the blur processing is performed.

15. The computer device according to claim 14, wherein the picture of the third-party view of angle is superimposed onto the playback picture on which the blur processing is performed.

16. The computer device according to claim 10, wherein the program code further comprises:

stopping code configured to cause at least one of the at least one processor to, in response to receiving a playback stop instruction, stop importing the manipulation data into the runtime library, to end the playback processing;

receiving code configured to cause at least one of the at least one processor to, by using the runtime library, receive instant manipulation data, and transfer the instant manipulation data to the VR application; and second generating code configured to cause at least one of the at least one processor to generate a VR picture by using the VR application based on the instant manipulation data, and display the VR picture.

17. The method according to claim 1, wherein the obtaining the picture drawing parameter value comprises:

obtaining, by at least one of the at least one processor, the picture drawing parameter value transferred by the VR application to the drawing function by using a hook function injected into the drawing function, and wherein the invoking comprises:

invoking, by at least one of the at least one processor, the drawing function by using the hook function injected into the drawing function, to draw the picture of the third-party view of angle based on the changed picture drawing parameter value.

18. A non-transitory storage medium storing a computer-readable instruction, which is executable by at least one processor to perform:

restoring the VR application to an initial running state in response to receiving a playback start instruction;

obtaining manipulation data that are transmitted to a runtime library to be pre-captured and stored, the manipulation data having a time sequence and being used to control running of the VR application;

importing the manipulation data into the runtime library according to the time sequence; and transferring the imported manipulation data to the VR application in the initial running state by using the runtime library and performing playback processing based on the transferred manipulation data, wherein the computer-readable instruction is executable by the at least one processor to further perform:

obtaining a playback picture that is generated by the VR application based on the manipulation data, the playback picture being a picture of a first-party view of angle based on a picture drawing parameter value transferred by the VR application to a drawing function in the VR application;

changing the picture drawing parameter value based on a drawing parameter value conversion relationship of the first-party view of angle and a third-party view of angle;

invoking the drawing function in the VR application, to obtain a picture of the third-party view of angle by changing the picture drawing parameter; and displaying the picture of the third-party view of angle, to superimpose the picture of the third-party view of angle onto the playback picture.

\* \* \* \* \*